United States Patent [19]

Tanaka et al.

[11] Patent Number: 5,144,387
[45] Date of Patent: Sep. 1, 1992

[54] COLOR IMAGE FORMING APPARATUS

[75] Inventors: Hideyuki Tanaka, Hyogo; Takao Ichihashi; Hiroyuki Deguchi, both of Osaka, all of Japan

[73] Assignee: Mita Industrial Co., Ltd., Osaka, Japan

[21] Appl. No.: 788,095

[22] Filed: Nov. 5, 1991

[30] Foreign Application Priority Data

Nov. 13, 1990 [JP] Japan .................................. 2-308243

[51] Int. Cl.⁵ ............................................. G03G 15/01
[52] U.S. Cl. .................................. 355/326; 355/245; 346/157
[58] Field of Search ............................... 355/326–328, 355/245; 346/157; 358/75, 78, 80

[56] References Cited

U.S. PATENT DOCUMENTS 4,864,357  9/1989  Matsunawa et al. ............ 355/326 X
4,922,298  5/1990  Folkins ........................... 355/328 X Primary Examiner—R. L. Moses
Attorney, Agent, or Firm—Koda and Androlia

[57] ABSTRACT

A color image forming apparatus provided with an image sensor making outputs for every primary color of light through reading and resolving color images to the three primary colors thereof, can exclude unnecessary developing operation pertaining to other developing agents than one or two kinds of developing agent, by distinguishing the colors based on the output per primary color from the image sensor when the color image is read, executing the developing operation through operating only the developers to accommodate one or two kinds of developing agent in the case the color distinguished at that time is the color possible to be expressed only with one or two kinds of developing agent, on the time of reproducing the color image through repeating the developing operations by a plurality of kinds of developing agent acording to the output per primary color from the image sensor.

5 Claims, 3 Drawing Sheets

COLOR IMAGE FORMING APPARATUS

BACKGROUND OF THE INVENTION

1. Field of the Invention

The present invention relates to a color image forming apparatus by which a color image can be read and can be reproduced by using a plurality of kinds of developing agent, and more particularly relates to a color image forming apparatus in which in the case that the read color image is composed of and expressed only with colors of one or two kinds of developing agent the developing operation with the other remaining developing agents can be excluded.

2. Description of the Prior Art

It is general that a color copying machine which is one of the examples of such a color image forming apparatus as shown above is what is provided with four developers, each of which accommodates and corresponds to respective toners (developing agents) of the three colors of YELLOW (Y), MAGENTA (M), and CYAN (C) and BLACK (Bk). The color image forming apparatus can resolve a color image read by for example a CCD sensor to the three primary colors (RGB) of light and makes output per primary color. Furthermore, the color image forming apparatus repeats developing operations in order per developer accommodating per kind of toner in three or four kinds of them (Y, M, C, or Y, M, C, Bk) according to the output per primary color coming from the CCD sensor, and reproduces the above color image onto a transfer sheet.

In such a color copying machine described above, there is such a type as having a function to judge whether or not the color image of, for example, a document is BLACK through executing preparatory reading scanning for the document. For example, when the R output, G output and B output obtained through the preparatory reading scanning by the CCD sensor are almost the same value (there are many cases that the output is zero) or the R output, G output and B output are those of a specified ratio which is peculiar to BLACK according to the spectral characteristics of the light source, the color copying machine judges that the color image is only of BLACK (Bk) and executes the developing operation only with a developer which accommodates the BLACK toner, thereby causing the developing operations with the developers accommodating the other toners than BLACK to be excluded.

Hence, in the case that the color image is only of a color (for example, Y, M or C) possible to be expressed only with for example one kind of color toner or only a color (for example, RED (R), GREEN (G), or BLUE (B)) possible to be expressed with two kinds of color toner except BLACK toner in each case, it should be possible to do with the developing operations only with one or two kinds of toner corresponding thereto.

However, even though the color image is of only the color possible to be expressed with the above one or two kinds of toner on the color except BLACK, the conventional color copying machine has repeatedly executed the developing operations by using all developers of toners of respective colors Y, M and C, according to each output of R, G and B coming from the CCD sensor.

SUMMARY OF THE INVENTION

The present invention has been made to solve such problems as mentioned above in the conventional arts.

It is therefore one of the primary objects of the present invention to provide a color image forming apparatus which can exclude developing operations by the unnecessary developers with regard to the corresponding colors in the case that the color of the read color image can be expressed only with one or two kinds of developing agent.

Namely, the point of the present invention lies in that a color image forming apparatus which is provided with an image sensor making outputs for every primary color of light through reading and resolving color images to the three primary colors thereof and can reproduce the color image by repeating the developing operations with a plurality of color kinds of developing agent according to the outputs per primary color from the image sensor is characterized in that it comprises color distinguishing means for distinguishing colors based on the outputs per primary color from the image sensor when a color image is read, and developer drive means for executing the developing operations by operating only one or two developers which accommodate the corresponding one or two kinds of developing agent when the color distinguished by the color distinguishing means can be expressed only with one or two kinds of developing agent.

In a color image forming apparatus according to the present invention, the color distinguishing means can distinguish colors based on the output per primary color of light from the image sensor when a color image is read by the image sensor. At this time, in the case that the color distinguished above can be expressed only with one or two kinds of developing agent, the above developer drive means can execute the developing operation by operating only one or two developers which accommodate one or two kinds of developing agent. Therefore, the developing operation with other developing agents than the corresponding one or two kinds of developing agent can be excluded.

The specification hereof points out the subject of the present invention well and ends with the claims which are clearly claimed. It is thought that the present invention can be well understood with the ensuing description with reference to the drawings attached hereto.

DETAILED DESCRIPTION OF THE PREFERRED EMBODIMENTS

Figure 1:
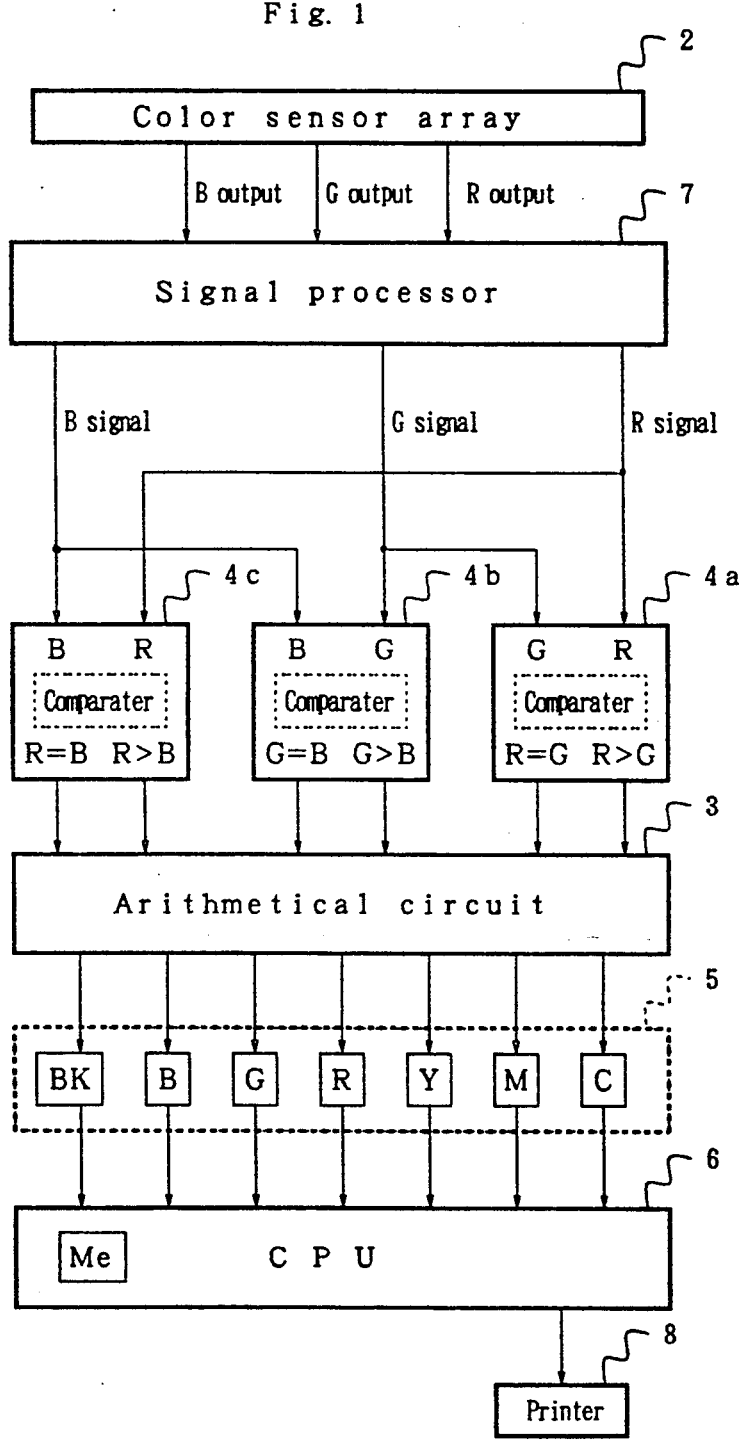
FIG. 1 is a block diagram showing the configuration of signal system of a color copying machine according to a preferred embodiment of a color image forming apparatus of the present invention.
Figure 2:
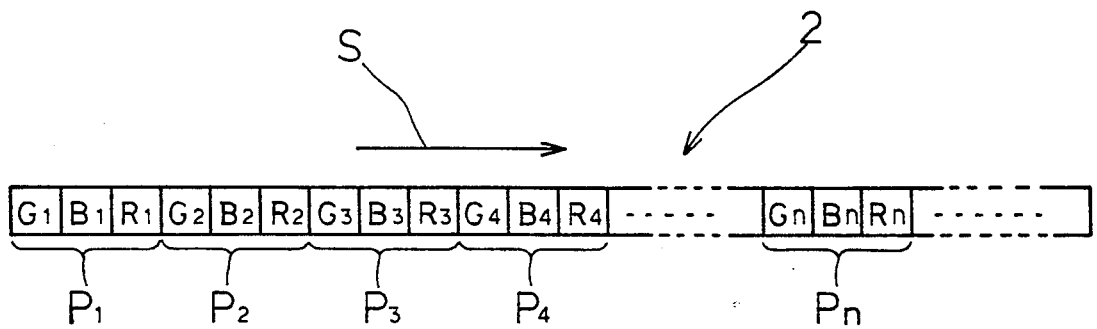
FIG. 2 is a conceptional view showing the outlined configuration of a color sensor array of the color copying machine.

As shown in FIG. 1 and FIG. 2, a color copying machine 1 according to a preferred embodiment of the present invention mainly consists of a color sensor array 2 (image sensor) which can read color images of a document placed on a document table (not illustrated) in the sub-scanning direction shown with an arrow S, a signal processor 7 to carry out analog/digital (A/D) conversion of output signals pertaining to R output, G output and B output per pixel $P_1$ through $P_n$, described later, of the corresponding color sensor array 2 and at the same time to output these output signals as respective signals R, G and B of the three primary colors of light according to the output values thereof, comparators $4_a$, $4_b$ and $4_c$ to compare pair by pair the output values of each of the above signals R, G and B, an arithmetical circuit 3 to distinguish color of the above color image based on the values of comparison computed by the comparators $4_a$, $4_b$ and $4_c$, a data conversion portion 5 to convert each signal R, G or B pertaining to the color distinguished by the corresponding arithmetical circuit 3 to the data signals relating to the corresponding color, and a central processing unit 6 which is composed mainly of a CPU to issue an operating command for image formation to a printer 8 and to control an exposure scanning system, etc. (not illustrated) based on the data signals from the data conversion portion 5. Furthermore, the document table and the color sensor array 2 can move relatively in the main scanning direction which is at a right angle to the sub-scanning direction.

The color sensor array 2 is composed so that each of the pixels $P_1$, ..., $P_n$ in which G pixels detecting the GREEN light from the color image and outputting as G output, B pixels detecting the BLUE light and outputting as B output, and R pixels detecting the RED light and outputting as R output are arranged one after another can be arranged in plurality in the sub-scanning direction (arrow S). Therefore, as it is not necessary to mechanically scan in the sub-scanning direction as well for example in the case of having used a single pixel, the color sensor array 2 has such a feature that the scanning speed is fast.

The printer 8 is composed so that it can be provided with a photosensitive drum (not illustrated) to form electrostatic latent images responsive to the color images on the outer circumference thereof and four developers (not illustrated), each of which accommodates and corresponds to respective toners of three colors (YELLOW (Y), MAGENTA (M) and CYAN (C)) and BLACK (Bk). And the printer 8 can move, one after another, each of the developers to the developing positions confronted to the photosensitive drum responsive to signals from the central processing unit 6 and can supply toners of the corresponding colors to the electrostatic latent images on the photosensitive drum.

A color copying machine 1 according to this embodiment of the present invention is so composed as shown above.

Figure 3:
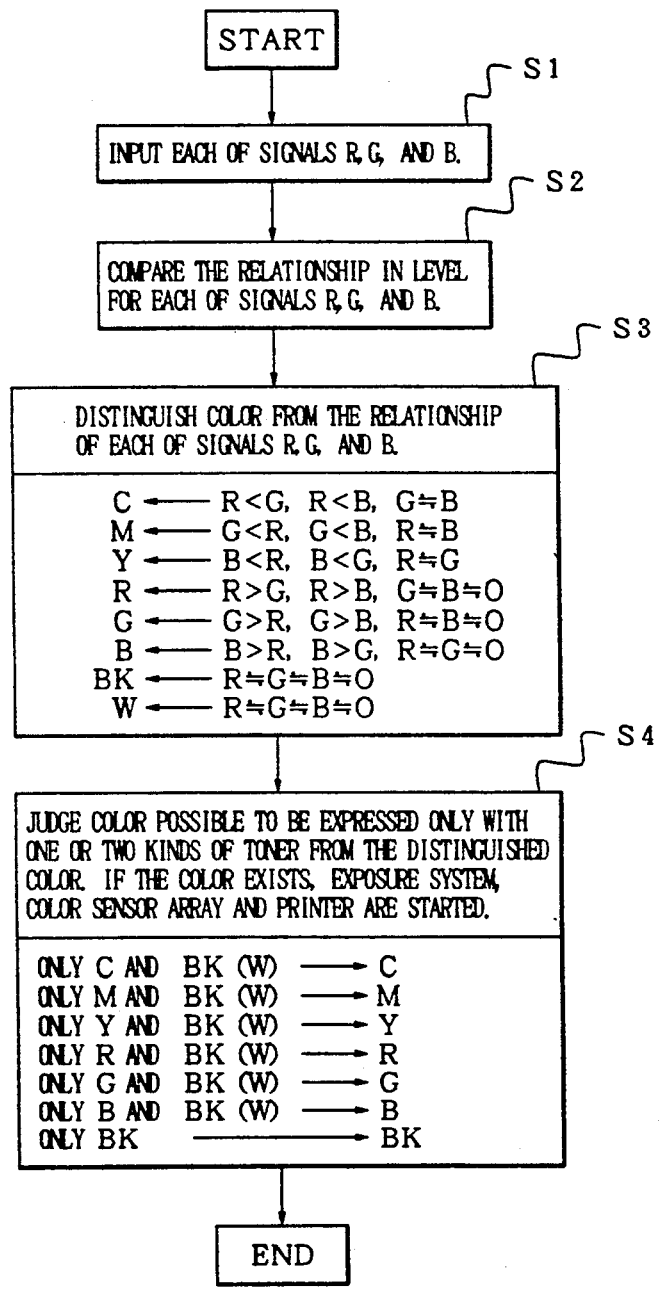
FIG. 3 is a flow chart showing the processing procedure pertaining to controls of the color copying machine.

Continuously, the image forming operation of a color image by the color copying machine 1 is described in the order of the following processing steps S1, S2, ... with reference to the flow chart in FIG. 3. The processing procedure shown in the above flow chart is stored in advance in a memory Me of the central processing unit 6 as program.

Prior to actual copying processing, in the color copying machine 1, a preparatory reading scanning (hereinafter called pre-scan) is carried out for the purpose of detecting the color condition of a color image of the document, i.e., whether or not the color of the color image can be expressed only with one or two kinds of toner.

In the pre-scan, firstly, the color image can be read by the color sensor array 2. And each of the outputs R, G and B which are outputted from respective pixels $P_1$, ..., $P_n$ of the color sensor array 2 are converted to the respective signals R, G and B as digital signals by the signal processor 7. Thereafter, the signals R, G and B are inputted respectively in the comparators $4_a$, $4_b$ and $4_c$ where they should be data-processed (S1). Wherein, R signal and G signal are compared with each other and arithmetically computed in the comparator $4_a$ for the level thereof, G signal and B signal are done in the comparator $4_b$ therefor, and R signal and B signal are done in the comparator $4_c$ therefor (S2).

And the results of comparison by these comparators $4_a$, $4_b$ and $4_c$ are inputted in an arithmetical circuit 3 and are used for color distinguishing processing of the color image (S3). For example, a specified portion of the color image is read by the color sensor array 2. Hence, at this time, in the case that the signal values pertaining to the G elements, $G_1$, ..., $G_n$ are all zero and the signal values pertaining to the B elements $B_1$, ..., $B_n$ and the R elements $R_1$, ..., $R_n$ are the output almost equivalent thereto, the arithmetical circuit 3 makes a judgement that the color of the specified portion is MAGENTA (M).

On the other hand, for example, in the case that the signal values pertaining to the G elements, B elements, and R elements are all the same (there are many cases that the signal values are almost equivalent to zero), the above specified portion of the color image is distinguished to be BLACK (Bk) or WHITE (W). Judgement on whether the color image is BLACK or WHITE is made based on the brightness of a document detected separately.

Also, in the case that the signal values pertaining to, for example, both the R element and B element are equal to zero and a certain output is issued as signal pertaining to the G element, the above color image is distinguished to be GREEN (G).

Namely, means for realizing a function to distinguish color of the color image based on each output R, G or B from each pixel $P_1$, ..., $P_n$ when the above color image is read by the color sensor array 2 in the above step S3 is color distinguishing means, and the step S3 for realizing the above function is the first color distinguishing step.

Actually, all the portions of color images of the above document is read one after another along with the main scanning direction which is at a right angle to the sub-scanning direction (Arrow S) by a color sensor array 2, and the colors of all the portions are distinguished one after another. Hence, the arithmetical circuit 3 can judge the colors distinguished at all the above portions (S4).

For example, in the case that the above distinguished colors are CYAN (C) and BLACK (Bk) (or WHITE (W)), the color of the above color image is judged to be only CYAN (C). At this time, as the above CYAN (C) is the color possible to be expressed only with a toner of CYAN, the data signal pertaining to this CYAN is inputted in the above central processing unit 6 via the data conversion portion 5.

Hence, the central processing unit 6 makes the exposure scanning system and the color sensor array 2 execute the reading actions for actual copying processing, and at the same time, can output a developing operation command in order to operate only the developer to accommodate the toner of the above CYAN based on the data signals pertaining to the above CYAN. Thereby the printer 8 can make a developing operation by operating only the developer of CYAN without operating the developers of other toners than CYAN.

And, for example, in the case that the colors distinguished above are RED (R) and BLACK (Bk) (or WHITE (W), the color of the above color image is judged to be only RED. In this case, as RED is the color possible to be expressed with two kinds of toners of MAGENTA (M) and YELLOW (Y), only the developer to accommodate the toner of above MAGENTA and the developer to accommodate the toner of YELLOW of the printer 8 are operated by a developing operation command from the central processing unit 6, thereby causing the developing operation to be executed.

Namely, the step for realizing a function of the step S4 to judge whether or not the color distinguished in the above step S3 is the color possible to be expressed only with one or two kinds of toner is the second color distinguishing step. And in the case the color distinguished in the above step S3 is the color possible to be expressed only with one or two kinds of toner, in other words, in the case that it is judged to be the color possible to be expressed only with one or two kinds of toner in the second color distinguishing step, means for realizing a function of the step S4 in which the developing operation is carried out by operating only the developers to accommodate the above one or two kinds of toner is the developer drive means and the step to realize the above function is the developer drive step.

As described above, a color copying machine 1 according to this embodiment of the present invention can distinguish the color of the color image based on the output per R, B, or G of each pixel of the color sensor array 2. In the case that it is judged whether or not the color distinguished at this time is the color possible to be expressed only with the above one or two kinds of toner and in the case that the color is a color possible to be expressed only with the above one or two kinds of toner, the developing operation is carried out by operating only the developers to accommodate the above one or two kinds of toner. Therefore, the developing operation made by other toners than the corresponding one or two kinds of toner can be excluded. Thereby, it is possible to suppress the useless consumption of toner. Further, the copying time can be attempted to be shortened.

Namely, according to the present invention, in the case that the color of the color image read by the image sensor is the color possible to be expressed with one or two kinds of developing agent, unnecessary developing operations relating to the corresponding colors can be saved.

Furthermore, in the above preferred embodiment, color distinguishing processing of the color image can be carried out by using respective elements G, B, and R of all the pixels $P_1, \ldots, P_n$ of the color sensor array 2 at the time of pre-scanning. However, there is no need to use all the respective elements of G, B and R. Namely, output from each element of G, B or R thinned out per pixel in an appointed order of arrangement of primary colors from these elements G, B and R can be utilized in the above color distinction processing. The output from respective elements of for example $G_1, B_2, R_3, \ldots, G_n, B_{n+1}, R_{n+2}$, which are thinned out in the above sub-scanning direction and outputted per pixel can be used, too. Thereby, the number of the outputs or signals to the signal processor 7, comparators $4_a, 4_b$ and $4_c$ and arithmetical circuit 3 can be decreased. Therefore, a color copying machine of such a composition is preferable in the case copying images of high resolving power are not needed but high speed copying actions are needed.

The present invention can be embodied in other embodiments without departing from the spirit thereof or the substantial features thereof.

Therefore, the above preferred embodiment is a preferable example, but it is not limited to the above preferred embodiment.

Furthermore, it can be easily understood that all modifications and/or variations which can be produced in the scope of the invention described in the claims described later or in the scope meant by the claims thereof are all included in the claims hereof.

What is claimed is:

1. A color image forming apparatus which is provided with an image sensor making outputs for every primary color of light through reading and resolving color images to the three primary colors thereof and can reproduce the color images by repeating the developing operations by a plurality of color kinds of developing agent according to the outputs per primary color from the image sensor, comprising;
   color distinguishing means for distinguishing colors based on the outputs per primary color from the image sensor when a color image is read, and
   developer drive means for executing the developing operations by operating only one or two developers which accommodate the corresponding one or two kinds of developing agent when the color distinguished by the color distinguishing means can be expressed only with one or two kinds of developing agent.

2. A color image forming apparatus claimed in the claim 1, wherein the color distinguishing means consists of comparators which can compare pair by pair the output per primary color from the image sensor and an arithmetical circuit to distinguish the color based on the values of comparison from the comparators.

3. A color image forming method which, by using an image sensor making outputs for every primary color of light through reading and resolving color images to the three primary colors thereof, can reproduce the color images by repeating the developing operations by a plurality of color kinds of developing agent according to the outputs per primary color from the image sensor, comprising;
   first color distinguishing step for distinguishing colors based on the outputs per primary color from the image sensor when a color image is read,
   a second color distinguishing step for distinguishing whether or not the color distinguished in the first distinguishing step can be expressed only with one or two kinds of developing agent, and
   a developer drive step for executing the developing operations by operating only one or two developers which accommodate the corresponding one or two kinds of developing agent in the case that the color distinguished by the second color distinguishing step can be expressed only with one or two kinds of developing agent.

4. A color image forming apparatus claimed in the claim 1 or 2, wherein the image sensor has a plurality of pixel consisting of three elements, which can detect the three primary colors of light and output them per primary color, in the sub-scanning direction.

5. A color image forming apparatus claimed in the claim 4, wherein the output per primary color from each pixel of the image sensor is carried out after being thinned out in an appointed order of arrangement of primary colors.

* * * * *